Nov. 12, 1957 A. H. HANSON 2,812,951
SKID JACK
Filed July 19, 1956 3 Sheets-Sheet 1
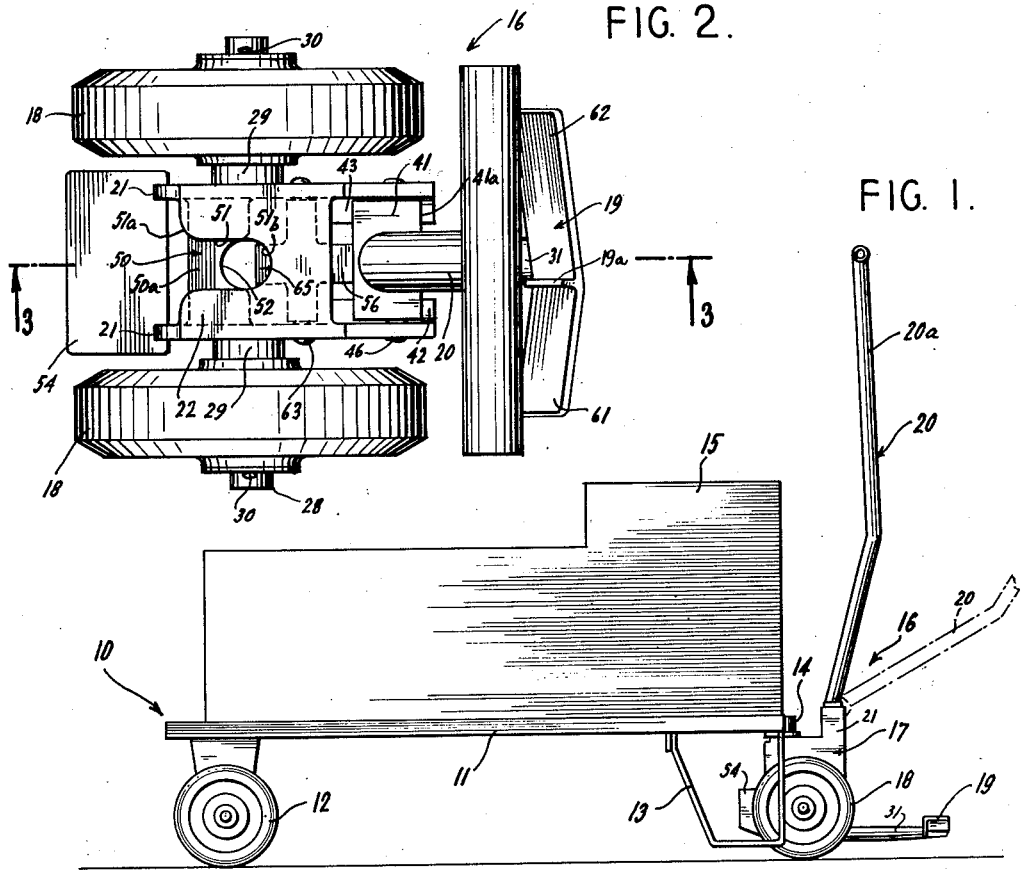
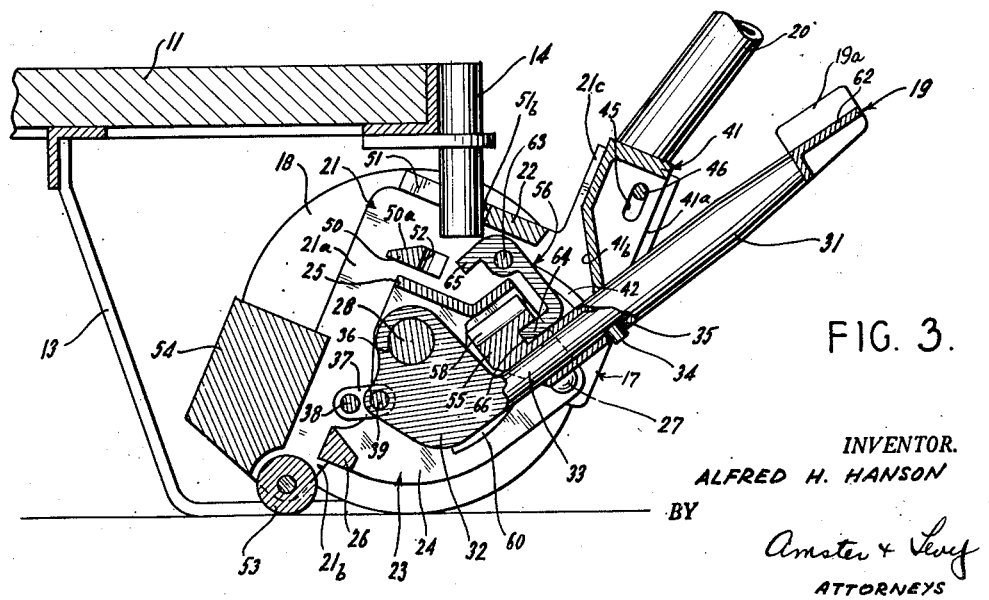
INVENTOR.
ALFRED H. HANSON
BY
Amster + Levy
ATTORNEYS Nov. 12, 1957 A. H. HANSON 2,812,951
SKID JACK
Filed July 19, 1956 3 Sheets-Sheet 2

INVENTOR.
ALFRED H. HANSON
BY
Amster + Levy
ATTORNEYS

Nov. 12, 1957 A. H. HANSON 2,812,951
SKID JACK
Filed July 19, 1956 3 Sheets-Sheet 3
FIG. 6
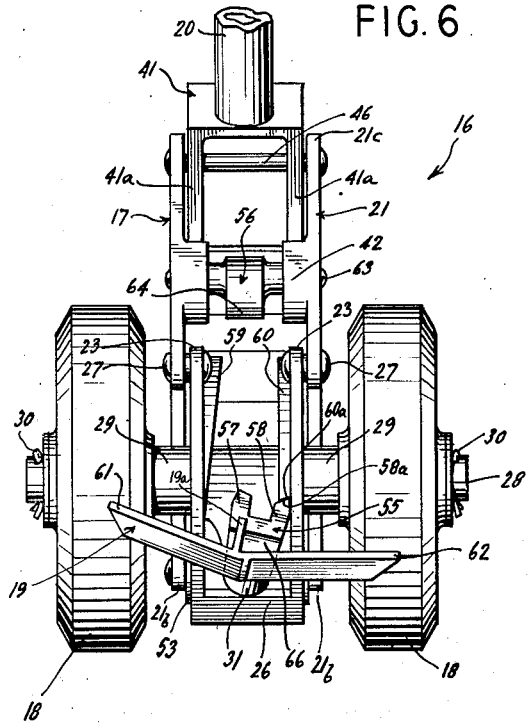
FIG. 8
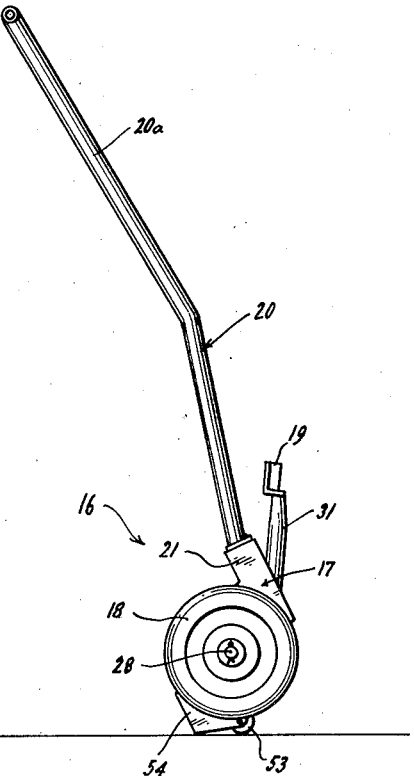
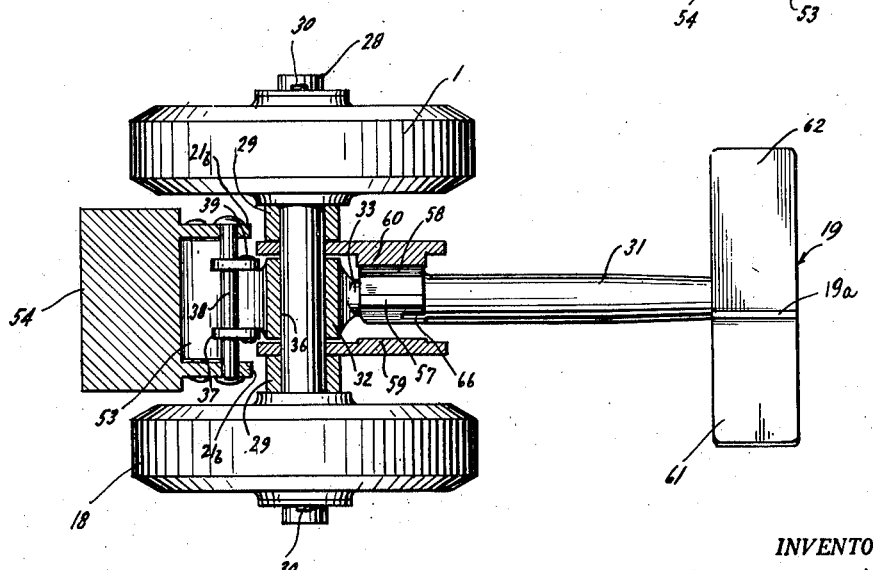
FIG. 7
INVENTOR.
ALFRED H. HANSON
BY
*Amster & Levy*
ATTORNEYS

United States Patent Office 2,812,951
Patented Nov. 12, 1957

2,812,951

SKID JACK

Alfred H. Hanson, Garrison, N. Y., assignor to The Fairbanks Company, New York, N. Y., a corporation of New York Application July 19, 1956, Serial No. 598,903

16 Claims. (Cl. 280—46)

This invention relates to improvements in materials handling equipment and has particular reference to a new and improved skid jack.

Skid jacks are commonly used for the manual transportation of movable platforms or semi-live skid trucks. A skid truck of this type has a flat horizontal wooden platform supported above the floor in the rear by two wheels, and in the front by two rigid steel legs. The skid jack is coupled to the skid truck in the front between two steel legs and is used to raise these legs above the floor so that they have a clearance of about one inch. The skid jack itself has two wheels so arranged that when the rigid legs of the skid truck are raised above the floor surface, the truck is supported by the wheels of the jack which serve as the front wheels thereof so that the truck may be rolled along the floor by pulling or pushing on the handle of the skid jack.

Skid trucks or platforms are generally about three feet wide and six feet long, and are built to support loads of as much as 3,000 pounds. Since half of the total load on the platform is supported by the rear wheels of the truck, the skid jack should be made to support a load of approximately 1,500 pounds.

In the conventional skid jack assemblies it has been common practice to employ the jack handle as a lever for actuating the jack assembly and lifting the load. While a large mechanical advantage is realized by using the normal jack handle in this manner, a special locking arrangement is made necessary for uncoupling the handle from the jack lifting assembly when the handle is used for pushing or pulling the load. In addition, in this type of jack an extremely strong spring is invariably used to pull the handle back to a vertical position. As the handle length is approximately five feet and the handle has appreciable weight, the spring is subjected to extreme wear and breakage of the spring often occurs. In addition, the design of such skid jacks is such that if the operator does not complete the locking action by full handle depression, the handle might unexpectedly fly back causing serious injury.

A further problem of the conventional skid jack design is the difficulty in coupling the jack to the skid truck. For this purpose, all skid trucks are provided with a depending coupling pin at the center of their forward edge. Conventional skid jacks are provided on the top edge with a circular hole or socket sized to receive and retain this coupling pin. The conventional skid jacks are so sized that their top surface is normally below the level of this coupling pin, so that engagements may be made by rolling the jack forwardly until the socket is directly beneath said coupling pin. The operator must then depress the handle to raise the jack body until the socket receives the coupling pin of the skid truck. It often happens, however, that the socket is improperly located beneath the pin, so that when the lifting of the jack occurs, the pin slips suddenly into the socket while under heavy lifting pressure with a consequent high impact, or the jack itself may slip out from beneath the skid. In any event, improper coupling results in waste of time, annoyance and possible damage.

In addition, a clearance of about ½ inch must exist between the bottom edge of the coupling pin and the top of the jack socket. Since the coupling pin is invariably made approximately two inches long, it therefore follows that at least 2½ inches of lost motion must occur before the top of the jack engages the bottom surface of the skid truck and commences to lift the load. Since the greater part of the lifting movement of the jack is expended in this lost motion travel, it is obvious that the efficiency of the jack, insofar as mechanical advantage is concerned, is greatly impaired.

According to the present invention there is provided a skid jack in which the entire lifting force is accomplished by means of a short foot pedal which extends a maximum of approximately ten inches beyond the jack body. The foot pedal actuates a lifting mechanism which provides a ten to one mechanical advantage ratio. The mechanism operates without springs and contains means for automatically locking the pedal in the raised position of the jack so that it cannot be dislodged accidentally. The jack is thus foolproof and cannot result in injury to the operator.

An object of the invention is to provide a jack of the character described having improved coupling means for attachment to the skid truck. This means includes a split socket having an open front end so that engagement with the coupling pin of the skid truck is accomplished merely by pushing the jack forwardly beneath said skid truck, and eliminating the necessity for aligning the socket with the coupling pin. This split socket construction also provides means whereby a jack body of greater height is employed, the top surface of the jack engaging the bottom surface of the skid truck at the time of coupling, so that the lost motion travel of the jack previously described is eliminated.

Another object of the invention is the provision of a skid jack of the character described which is made of a few simple parts, is economical in manufacture, is simple in operation, is extremely compact, and is capable of supporting itself in an upright position when not in use, or for storage.

Additional objects and advantages of the invention will become apparent in the course of the following specification when taken in connection with the accompanying drawings in which:

Fig. 1 is a side elevational view of a skid jack made in accordance with the invention and shown supporting the front end of a skid truck carrying a load, the jack handle being shown in upright, inoperative position in full line, and in an inclined operative position in broken line;

Fig. 2 is a top plan view of the skid jack in the position shown in Fig. 1;

Fig. 3 is a section taken along line 3—3 of Fig. 2, and showing the jack as it is brought into engagement with the coupling pin of the skid truck;

Fig. 6 is a rear elevation of the jack lower portion in the same position as shown in Fig. 5;

Fig. 7 is a section taken along line 7—7 of Fig. 5; and

Fig. 8 is a side elevational view showing the jack standing in its upright position for storage.

Figure 4:
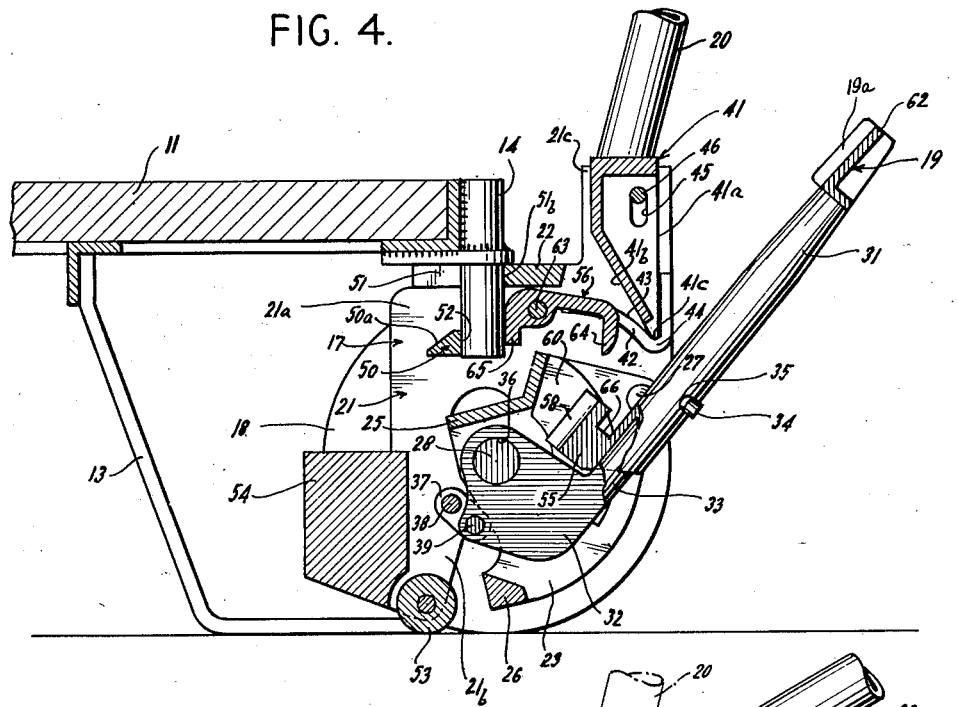
Fig. 4 is a central vertical section similar to Fig. 3 but showing the jack in a raised operative position in which the coupling pin is fully received within the split socket and the jack mechanism is released and ready to raise the skid truck.

Fig. 1 shows a skid truck or platform of conventional and standardized construction. Such a truck is referred to as a "semi-live" skid truck because it has wheels at one end and rigid skids or legs at the other end, and cannot be moved along the ground surface unless the legs are raised above said ground surface. The skid truck 10 has the usual horizontal wooden platform 11 supported at its rear end by a pair of wheels 12 and at its front end by a pair of depending legs or skids 13. Mounted centrally on the front edge of the platform 11 in the usual manner is a depending cylindrical metal coupling pin 14. The skid truck 10 is shown supporting a heavy load 15.

Fig. 1 shows the front end of the skid truck held in a raised position by the skid jack 16 of the present invention. The skid jack 16 comprises a body member 17 mounted on a pair of wheels 18 and having a foot pedal 19 for actuating the lift assembly of the jack, and a handle 20 by means of which the jack may be manually pushed or pulled for transporting the skid truck 10 along the ground surface upon its rear wheels 12 and also upon the wheels 18 of the jack.

Referring to Figures 2 through 7, it may be seen that the jack body frame 17 comprises a pair of spaced parallel side plates 21 connected by a top plate 22. The side plates 21 are of identical shape, each having a transverse central portion 21a, an integral portion 21b depending from one end of the central portion 21a, and an upstanding portion 21c at the other end of the central portion. An inner body member 23 is hinged to the main body frame 17 and comprises a pair of spaced parallel plates 24 of identical size and shape connected at their top ends by an angular wall 25 and at their bottom ends by a transverse wall portion 26. The plates 24 are located between the side plates 21 and are hinged thereto by pivot pins 27 as shown in Fig. 6.

The forward ends of the inner plates 24 carry a cylindrical axle 28 upon the ends of which the pair of wheels 18 are rotatably mounted. The wheels 18 are held from lateral movement by a pair of spacer sleeves 29 located respectively between the inner plates 24 and the inner surfaces of the wheels, and by a pair of cotter pins 30 extending through the ends of the axle adjacent to the outer surface of the wheels, as shown in Figs. 6 and 7.

The foot pedal 19 is mounted rigidly on the end of a tubular shaft 31 by means of which the foot pedal is coupled to an extension piece 32. This extension piece has an integral cylindrical metal rod 33 which extends into the free open end of the hollow tubular shaft 31. It will thus be observed that the tubular shaft 31 is turnable about the axis of the cylindrical rod 33, this turning movement being limited by a stop pin 34 projecting radially from the cylindrical rod 33 and extending through an elongated slot 35 in the tubular shaft 31. This limited turning movement is provided for locking and unlocking the foot pedal 19 in its lowermost lift position, as will be presently described.

The forward end of the extension piece 32 has a through bore 36 which receives the central portion of the wheel axle 28, as is clearly shown in Figs. 3 to 7. The foot pedal assembly is thus pivoted about the center of said axle 28. A pair of identical metal links 37 at each side of the extension piece 32 connect the lower forward end of said extension piece to the respective main body frame side plates 21. Each link 37 is connected by a pivot pin 38 to the lower end of the depending side plate portion 21b and by a pivot pin 39 to the lower end of the extension piece 32.

The skid jack handle 20 is mounted between the upstanding side plate portions 21c. The bottom end of the handle 20 terminates in a channel shaped locking member 41. Each side wall of said locking member 41 is in the form of an inverted right triangle having a vertical rear surface 41a joining an inclined forward surface 41b at a sharp bottom angle or point 41c.

Each side plate 21 has on its inner surface an integral lateral flange 42 which has an inclined upper surface 43 terminating in a depressed well or socket 44. The socket 44 serves as a seat to maintain the handle 20 in its upstanding position, as will be presently explained.

The side walls of locking member 41 have aligned vertically-elongated slots 45 through which extend a pin 46 fixed to the side plate upstanding portions 21c. The handle 20 is thus pivotable about pin 46 between an upstanding position shown in Figs. 1 and 4 and the inclined position shown in Fig. 5. As shown in Fig. 1, the tubular handle 20 is bent slightly below its center to provide an offset upper handle portion 20a. In the upstanding, inoperative position of the handle, the upper handle portion 20a is substantially perpendicular to the floor surface, and is spaced forwardly of the truck platform 11 to provide clearance for overhang of the truck load forwardly of the front edge of the platform 11.

Figure 5:
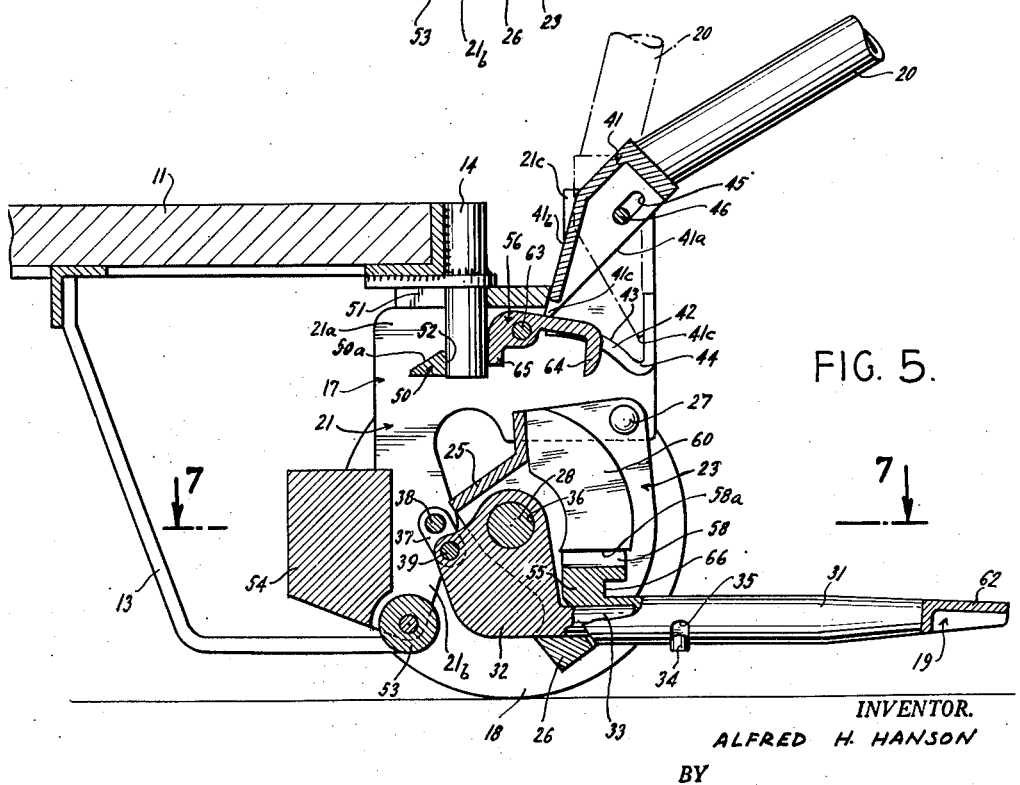
Fig. 5 is a section similar to Fig. 4 but showing the foot pedal depressed, and the jack frame raised, and the jack handle in a forwardly inclined position.

As best seen in Fig. 4, when the handle 20 is in its upright position the bottom points 41c of locking member 41 are located within the sockets 44 of the flanges 42, and are held therein by the weight of the upstanding handle. When the operator desires to bring the handle to an inclined position for pushing or pulling the jack and the coupled skid truck, it is merely necessary to pull rearwardly on the top of the handle in a normal manner, thus pivoting the handle and causing the locking member points 41c to leave sockets 44 and ride up the inclined surfaces 43 of the flanges 42. Downward pivoting of the handle 20 is limited by engagement of the locking member 41 with the top plate 22 of the main body frame 17, as shown in Fig. 5. The elongated slots 45 in locking member 41 provide a moving pivot which permits the locking member points 41c to travel along the inclined flange surfaces 43. Forward pivoting of the handle beyond the desired vertical position is limited by engagement of the channel wall edges 41a of locking member 41 striking the rear vertical sections of socket flanges 42. The intent of the handle design so described is to provide suitable handle positioning for all operating conditions without resort to the use of springs.

The jack has an improved split socket construction which permits easy coupling of the jack with the skid truck. This split socket includes the top plate 22 and an inner plate 50 extending the width of the main body frame and fixed to the side plates 21. The inner plate 50 is parallel to and spaced beneath the top plate 22. The top plate 22 has a central slot 51 extending inwardly from its leading edge. As shown in Fig. 2, this central slot 51 has straight side edges, a flared widened front opening 51a which acts as a guide in receiving the coupling pin of the skid truck, and a semi-circular terminal portion 51b. As shown in Figs. 2 and 3, the plate 50 also has a semi-circular slot 52 facing in the opposite direction, and an inclined upper surface 50a leading to the slot 52. As seen in Fig. 2, the semi-circular slot 52 is aligned with the semi-circular portion 51b of the top plate slot 51, the two slots forming a split circular socket for receiving the coupling pin 14 of the skid truck.

A roller 53 is mounted at the bottom of the main body frame 17 in a position to engage the floor surface along with the wheels 12 when the jack assembly is not in its lift position. The main body frame 17 also has a weight 54 fixed to its lower end for a purpose which will be presently described.

The jack also includes a latch 55 for holding the foot pedal in its lowered lift position, and a second latch 56 for holding the lift assembly and foot upedal in a raised inoperative position. The latch 55 is in the form of a member integral with the end of the tubular foot pedal shaft 31. This latch member has a pair of spaced, upstanding arms 57 and 58. The body frame side plates 23 each have an integrally-cast wide flat boss 59 and 60, which bosses face inwardly. The boss 59 tapers downwardly as shown in Fig. 6, to provide a cam surface. The boss 60 is of uniform width and has a sharp angular cut or notch 60a at its bottom end.

The foot pedal 19 is made in dihedral form, as shown in Fig. 6 with a left hand section 61 arranged at a slight angle to the right hand section 62. Since the foot pedal tubular shaft 31 is rotatable about the cylindrical rod 33 of extension piece 32, it will be observed that depression of section 61 will pivot the latch 55 in a counterclockwise direction as viewed in Fig. 6, and depression of the section 62 will pivot latch 55 in a clockwise direction.

When the jack 16 is to be actuated to raise the front of the skid truck 10, the foot pedal 19 is initially in the raised position shown in Fig. 4. The operator then places his foot on the foot pedal section 62 and depresses the foot pedal 19 to its lowermost position shown in Fig. 5. This lowering of the foot pedal actuates the jack lift mechanism. At the same time, depression of the pedal section 62 pivots the latch 55 in a clockwise direction so that the arm 58 slides along the boss 60. At the bottom limit of travel of the foot pedal 19, the arm 58 clears the boss 60 and pivots further until it is direcly beneath said boss. It will be noted that the top of arm 58 is formed with an angular tooth 58a. When downward pressure on the foot pedal is eased, the arm 58 rises slightly and its tooth 58a enters the bottom notch 60a of boss 60, securely locking the foot pedal in its lowered position. The latch 55 is thus a safety mechanism, since accidental striking of the end of pedal 19 against the ground surface or other objects cannot dislodge the latch, but only serves to increase the locking action.

To release the latch 55 and cause the jack to lower the front end of the skid truck, the foot pedal section 61 is depressed by the foot of the operator. It will be observed that foot pressure on the pedal section 61 produces a greater torque on shaft 31 than would the same foot pressure on the section 62, because of the vertical offset separator 19a, so that a greater rotating force or friction is produced when lowering the jack than is produced during the raising operation. To lower the skid truck, the pedal section 61 must be depressed by as much force as was required to lift the truck, the foot pedal being lowered until the latch tooth 58a, clears the notch 60a. The pedal then rotates counter-clockwise until the latch arm 57 engages the bottom of boss 59. The taper of boss 59 gives a decided braking action when the pedal is allowed to move upward by decreasing the foot pressure as required, the end of latch arm 57 sliding along the tapered surface of said boss 59, and bearing frictionally thereagainst. Combined action of the taper and increased friction thereby creates an efficient brake action.

The latch 56 functions to hold the jack lift assembly in a raised inoperative position when not in use. For this purpose, latch 56 is mounted on a pivot pin 63 which is mounted between the side plates 21 of main body frame 17. Latch 56 has a latch finger 64 at one end, and a depending tongue 65 at its other end. The body of latch 55 has a slot 66 tangent to and above the tubular foot pedal shaft 31, and best seen in Fig. 5. The latch finger 64 engages this slot 66 and holds the jack assembly locked in its raised inoperative position when not in use. When the skid truck coupling pin 14 enters the split socket, however, the coupling pin strikes the latch tongue 65, as shown in Fig. 4, pivoting latch 56 out of engagement with the slot and allowing the jack assembly to drop of its own weight. The jack is then in position for the lifting operation.

The drawings are substantially to scale and reference is made thereto for further disclosure.

Fig. 8 shows the jack 16 in a vertical upright position for storage, in which the entire assembly rests upon the roller 53 and weight 54. In this position, the handle 20 is locked in an upright position forwardly of center by engagement of the locking member 41 with the socket 44. This self-supporting upright storage position of the jack eliminates a safety hazard often encountered in conventional skid jacks which must lie parallel to the floor when not in use and are not readily seen so that they may be tripped over.

In use of the jack to raise and transport a skid truck, the operator grasps the top handle 20, pivots the jack rearwardly, and rolls it upon wheels 18 to the vicinity of the skid truck 10. He then steers the jack so that the truck coupling pin 14 enters the open front of slot 51 in top plate 22. In this movement, the widened front end 51a of slot 51 acts as a guide to insure proper entry of the pin 14 within said slot. It will be observed that this engagement of coupling pin 14 with the open front end of slot 51 can be made at angular dispositions of the jack body over a wide range. This is in contrast to conventional skid jacks which require the pin socket walls to be on an absolute vertical plane before the coupling pin can enter the closed circular socket vertically.

Fig. 3 shows the position of the jack assembly when the skid truck coupling pin 14 has entered the slot 51 and has moved to the semi-circular rear terminal portion 51b of said slot. Since the jack is now restrained by pin 14 from forward rolling movement, further forward pushing force by the operator on the handle 20 causes the jack to pivot forwardly due to action of roller 53 against the floor. The jack body is thus pivoted to the vertical position shown in Fig. 4, in which the bottom of coupling pin 14 enters the semi-circular slot of said inner plate. The coupling pin 14 is now firmly held in the split socket formed by both semi-circular slots 51b and 52.

Skid trucks are made in a standardized height, with the bottom of the wooden platform spaced eight and one-half inches above the ground surface. The skid jack 16 is dimensioned so that in the upright position of the jack body shown in Fig. 4, the top plate 22 is also spaced eight and one-half inches above the ground surface. Hence when the jack is brought to its upright position of Fig. 4, the top plate 22 is resting flush against the under surface of the front of the skid truck platform 11. When the foot pedal 19 is depressed, the front end of the skid truck 10 will be immediately lifted. This eliminates the lost motion travel of approximately 2½ inches required by conventional jacks having vertically-opening pin sockets, before the top of the pin socket engages the bottom surface of the skid truck.

Fig. 3 shows the coupling pin 14 entering the front of the socket, and the jack body in an inclined position resting on the roller 53 and wheels 18. In this position the jack assembly is still locked in its raised inoperative position by latch 64. The jack foot pedal 19 is close to the jack body frame 17 with its shaft 31 at an acute angle and substantially parallel to the jack handle 20.

When the coupling pin strikes the top plate 22 at the end of slot 51, as shown in Fig. 3, the jack cannot roll further toward the skid truck. However, since the operator is pushing forward on the handle, a continuation of this pushing will cause the handle to raise toward its vertical position of Fig. 1, and since the handle cannot pivot further in a counter-clockwise direction relative to the jack frame, it causes the jack frame to pivot. This pivoting movement of the jack frame is caused by engagement of the roller 53 with the ground surface. Since the roller 53 is offset forwardly of the wheel axle 28, the jack frame turns on said roller, moving to its vertical position of Fig. 4, the coupling pin 14 entering the slot 52 in inner plate 50. In this pivoting movement of the jack frame, the roller slides rearwardly along the floor, decreasing the distance between roller 53 and the end of coupling pin 14, as will be apparent from a comparison of Figs. 3 and 4, so that the top plate 22 is now closer to the bottom of platform 11. Thus, the natural action of the operator pressing forwardly on the handle 20 brings the jack frame to its operative position, and the fact that the top plate 22 assumes a horizontal position informs the operator that the coupling pin is properly received in both halves of the split socket.

When the coupling pin 14 fully enters the split socket, that is, when it is received in the slot 52 of inner plate 50, as shown in Fig. 4, said coupling pin engages the latch tongue 65 which is normally located within the interior area of the split socket. This trips latch 56, releasing the jack assembly and the wheel axle 28 carried thereby. The wheels 18 thereupon drop of their weight maintaining contact with the floor surface. Since the weight of the wheels 18 maintains their contact with the floor surface at all times, the forward tilting of the jack and release of the jack lift assembly causes the main body frame 17 to rise until the top plate 22 engages the under surface of the truck platform 11. The downward movement of the jack lift assembly moves the foot pedal 19 from its raised inoperative position of Fig. 3 to the operative position of Fig. 4 in which shaft 31 is disposed at an angle of approximately 50°.

The jack may then be actuated by depression of the foot pedal 19. This is accomplished by the operator placing his foot on the foot pedal section 62 and pushing downwardly thereon. Downward movement of foot pedal 19 is permitted by pivoting of the extension piece 32 about the wheel axle 28. This pivoting of extension piece 32 raises the main body frame 21 and causes a hinging action to occur between said main body frame and the inner body member 23.

When the extension piece 32 is turned about the wheel axle by depression of the foot pedal 19, it raises links 37 causing these links in turn to raise the main body frame 21. Since the main body frame is pivoted on inner body member 23 by pivot pins 27, the natural tendency of said main body frame would be to rotate in a clockwise direction, as viewed in Fig. 4, about the pivot pins 27. However, since the heavy load of the skid truck is bearing downwardly on the main body frame, the weight of this load maintains the top plate 22 in a horizontal position so that the main body frame 21 is maintained on a vertical plane while rising. This parallel motion is permitted by rotation of the inner body member 24 and by the links 37. Thus, as the main body frame 21 is raised vertically, the links 37 rotate about their pivots 38 and 39 in a clockwise direction. At the same time, the inner body member 24 turns in a counter-clockwise direction about the wheel axle 28 moving the pivots upwardly and inwardly. These moving pivots permit the body frame 21 to be raised substantially vertically and to remain vertically disposed. It can thus be seen that depression of the foot pedal causes a rotational lever action between body frame 21 and inner body member 23, these members opening like a pair of jaws to raise the body frame 21 above the wheels 18, in turn raising the front end of the skid truck 10 until its skids 13 are spaced above the ground area.

The arrangement of the links 37 is such that a dead area of jack assembly motion is provided when the jack assembly is released from its locked inoperative position, during which time the foot pedal shaft 31 remains in substantially the same angular position. Referring to Fig. 3, it will be seen that when the jack assembly is locked in its inoperative position, the links 37 are upwardly inclined, that is, the pivots 39 are located above the pivots 38. When the latch 56 is tripped by insertion of the coupling pin 14 within the split socket, the wheel axle 28 and its attached inner body member 23 begin to drop downwardly relative to the main body frame 17. The inner body frame 23 separates from the main body frame 21 by a distance of approximately one inch before the foot pedal shaft 31 begins to pivot downwardly. The foot pedal shaft thus remains in approximately the same angular position until the links 37 pivot past the horizontal to a downwardly inclined position. The dead area referred to is for the purpose of maintaining the pedal at an optimum position at the start of the lift, that is, at its highest possible position, so that it will travel the greatest possible distance downward before it reaches the floor level. Thus the maximum degree of leverage is provided by a foot pedal of minimum length. The dimensioning of the lift assembly produces a linear ratio of ten to one so that the pedal travels downwardly in an arc ten inches in length to produce a one inch lift of the load. The mechanical advantage of the lifting force is also in the ratio of ten to one. A full load on the skid truck may weigh 3,000 pounds which means a weight of approximately 1,500 pounds on the front end of the platform. A downward pressure by the operator on the foot pedal of 150 pounds would thus be sufficient to raise this load.

The foot pedal 19 may be depressed until the extension piece 32 strikes and is stopped by the transverse wall portion 26 of inner body member 23, as shown in Fig. 5, and the pedal shaft 31 is substantially horizontal or parallel to the floor surface. At this point, the bottom of the foot pedal latch arm 58 is located beneath the flat boss 60. When pressure on the foot pedal is released the latch tooth 58a enters the notch 60a, as shown in Fig. 4, locking the latch assembly in its raised position.

Up to this time, the handle 20 has been locked in its upstanding position. With the jack holding the skid truck in a raised position, it is necessary to unlock the handle so that it may be tilted angularly forward for pulling the load. For this purpose, the operator merely pulls rearwardly on the top of handle 20, the handle pivoting rearwardly and the points 41c of locking member 41 leaving the sockets 44 and riding up the inclined surfaces 43 of flanges 42. In transporting the skid truck, it will be appreciated that the jack socket may swivel about the skid truck coupling pin for steering the truck.

When the skid truck has been rolled to its destination, and it is desired to lower the skids into contact with the floor surface, the operator steps upon the foot pedal section 61. This lowers the foot pedal 19 slightly until its tooth 58a is clear of the notch 60a and the foot pedal pivots in a counter-clockwise direction as viewed in Fig. 6, until the latch arm 57 engages the tapered surface of boss 59. Pressure on the foot pedal is now released gradually, the latch arm 57 riding up boss 59, whose inclined surface acts as a brake to slow down the descent of the skid truck. The offset mounting of the foot pedal 19 on its shaft 31 results in a greater rotating force or torque being applied to the foot pedal when lowering the jack than when lifting, so that the latch arm 57 bears against the tapered boss 59 with considerable force to increase this braking effect.

Upward movement of the foot pedal 19 is halted when the body frame roller 53 engages the ground surface. In this position, the jack assembly is not yet in its fully collapsed position for engagement by the latch 56. A slight rearward pull on the handle, which is a normal function for removal of the jack, will then tilt the jack rearwardly to its normal inclined position of Fig. 3, the coupling pin 14 disengaging from the lower half 52 of the split socket. In this position, the main body frame 17 will move of itself to its fully collapsed position because of its own weight plus the weight 54 attached thereto, and latch 56 will engage and immobilize the lift mechanism. The purpose of the weight 54 will now be appreciated. This weight 54 biases the main body frame 17 downwardly when the jack is tilted rearwardly until the sleeves about the wheel axle 28 engage the under surface of the side plate central transverse sections 21a. The jack assembly is now in position to be locked, which locking occurs automatically, the latch finger 64 entering the slot 66.

The skid jack may now be withdrawn from the coupling pin by merely wheeling the jack rearwardly away from the skid truck.

The design of the jack is such that an extra or additional lift action is possible under difficult operating conditions. This is a feature not found in conventional jack constructions. It sometimes happens that the load on the skid truck is unbalanced so that when the front end is lifted by a jack, the platform twists, and one of the skids engages an uneven floor surface, preventing the truck from being moved. This situation also occurs when the truck is rolled over a door sill or similar obstruction, or moved onto a mis-aligned elevator. With conventional skid jacks, when one of the skids engages the floor surface, there is no way of moving the truck. The extra lift afforded by the skid jack of the present invention, is obtained by forcibly depressing the handle 20 downwardly toward the floor when the jack is in the position of Fig. 5. Since the handle 20 is locked from downward pivoting movement by engagement of the locking member 41 with the body frame top plate 22, the jack body is pivoted in a clockwise direction about the wheel axle 28 until the foot pedal 62 contacts the floor. This raises the front end of the top plate 22 an additional distance of approximately ⅜ inch, raising the jack skids the same distance, and enabling the skids to clear the obstruction.

This extra lift provided by pivoting the jack body is permitted by the offset construction of the split socket which, in the operative position of the jack, is approximately ¾ inch forward of the wheel axle 28, by the open front end of the top plate slot 51 (as contrasted to conventional closed circular sockets) which permits the top plate 22 to be tilted relative to the coupling pin 14, and by the fact that the handle 20 is completely divorced from the lift assembly of the jack. The length of the jack handle produces a leverage with sufficient mechanical advantage to provide the extra lift described above.

I have thus provided a skid jack whose lift mechanism is operable by a foot pedal which operates in a confined space, has no safety hazards, produces an adequate mechanical advantage, and contains no springs or complicated lock mechanisms. The handle of the jack is completely independent of the lift assembly, and the entire jack structure is rugged, fool proof, and practically unaffected by normal wear.

While a preferred embodiment of the invention has been shown and described herein, it is obvious that numerous additions, changes, and omissions may be made in this embodiment without departing from the spirit and scope of the invention.

I claim:

1. A skid jack comprising an axle, a pair of wheels mounted on said axle, a bipartite body frame which comprises an upper body member and a lower body member mounted on said axle, hinge means joining said upper and lower body members, and lift means for raising the upper body member relative to said lower body member and said wheels, said lift means comprising a foot pedal having a shaft pivotally mounted on said axle, and linkage means connecting the foot pedal shaft to said upper body member for raising said upper body member when said foot pedal is depressed, and lowering said upper body member when the foot pedal is raised.

2. A skid jack comprising an axle, a pair of wheels mounted on said axle, a body frame including an upper body frame and a lower body frame pivoted together, the lower body frame being turnably mounted on said wheel axle, a foot pedal having a shaft pivotally mounted on said axle, a link joining the end of the foot pedal shaft beyond the foot pedal pivot to the upper body frame whereby depression of said foot pedal will raise said upper body frame.

3. A skid jack for lifting one end of a semi-live skid truck said skid jack having a bipartite housing comprising a main body frame and an inner body frame hinged together at their rear ends, the main body frame having a horizontal top plate positioned to engage the under surface of said skid truck for lifting said truck, a wheel axle journalled in the inner body frame and carrying a pair of wheels, a foot pedal having a shaft extending rearwardly from the jack housing, the foot pedal shaft having a terminal extension rotatably mounted on said wheel axle, a link connecting the foot pedal shaft extension with said main body frame, whereby downward pivoting of said shaft upon depression of said foot pedal lifts said main body frame relative to the inner body frame and maintains the top plate in a horizontal position for raising said skid truck.

4. A skid jack for lifting one end of a semi-live skid truck, said skid jack having a bipartite housing comprising a main body frame and an inner body frame hinged together at their rear ends, the main body frame having a horizontal top plate positioned to engage the under surface of said skid truck for lifting said truck, a wheel axle journalled in the inner body frame and carrying a pair of wheels, a foot pedal having a shaft extending rearwardly from the jack housing, the foot pedal shaft having a terminal extension rotatably mounted on said wheel axle, a link pivotally connected at one end to the shaft extension below the wheel axle and pivotally connected at the other end to the main body frame, the foot pedal being positioned to be depressed by the foot of the jack operator, thereby pivoting the foot pedal shaft downwardly and causing the link to carry the main body frame upwardly relative to the wheels and the inner body frame, the main body frame being hinged to the inner body frame at a point above and rearwardly of the wheel axle to provide a pivot point about which the body frames separate when the foot pedal is depressed, the pivot point being movable upon rotation of the inner body frame about the wheel axle to maintain the top plate horizontal as the main body frame is raised.

5. A skid jack for lifting one end of a semi-live skid truck which has a platform and a coupling pin depending from said platform, said skid jack comprising a bipartite body frame including an upper body member and a lower body member hinged together, a pair of wheels mounted on the lower body member and normally resting upon the ground surface, a foot pedal coupled to the lower body member, linkage means connecting the foot pedal to the upper body member for causing a separation of the hinged body members when the foot pedal is depressed, thereby raising the upper body member, and a split socket in said upper body member for engaging and hold the coupling pin of said skid truck, said upper body member having a top plate for engagement with the under surface of said skid truck, the top plate having a forwardly-opening slot terminating in a rear semi-circular portion and constituting the upper half of said split socket, said upper body member also having an inner plate spaced beneath the top plate, the inner plate having a rearwardly-facing semi-circular slot constituting the lower half of said split socket, the split socket being adapted to receive the coupling pin with the latter extending vertically through both slots.

6. A skid jack according to claim 5 in which a projection of the semi-circular portion of the top plate slot into a plane common with the semi-circular slot of the inner plate forms a complete circle of a diameter equal to the diameter of said coupling pin.

7. A skid truck according to claim 5 in which the upper body frame has a depending portion carrying a roller located forwardly of the wheel axle, the front open end of the upper plate slot being sized to receive the coupling pin when the jack is tilted rearwardly and wheeled partially beneath said skid truck, the roller being then positioned to contact the ground surface and act as a pivot upon which the jack body frame may be tilted forwardly to an upright position in which the top plate is substantially horizontal and located beneath the skid truck platform.

8. A skid truck according to claim 5 in which the vertical distance between the roller and the upper surface of the top plate, when the jack body frame is in its upstanding position, is substantially equal to the distance between the floor surface and the bottom surface of the skid truck platform, said top plate being in flush abutment with the platform bottom surface for lifting the end of said platform immediately upon depression of said foot pedal.

9. A skid jack according to claim 5 in which said upper body member has a pivoted latch engageable with a slot in said foot pedal for locking said foot pedal in a raised inoperative position, said latch having a terminal tongue extending into said split socket and engageable by said coupling pin for tripping said latch and releasing said foot pedal when the coupling pin enters both halves of said socket.

10. A skid jack comprising a bipartite body frame mounted on wheels and including an upper body member and a lower body member, hinge means pivotally connecting the rear ends of said body members, said wheels having an axle upon which said body frame is rotatably mounted, lift means for raising said upper body frame relative to said lower body frame and said wheels, said lift means comprising a foot pedal having a shaft rotatably mounted on said wheel axle and extending rearwardly from said body frame, said shaft being pivotally coupled to the front end of said upper body member and having a raised inoperative position in which said body members are closely proximate to each other, said shaft being pivotable to a lowered operative position in which said body members are separated about said hinge means, whereby said upper body member is raised relative to said lower body member, and an elongated handle pivotally mounted at the rear end of said upper body member, said handle being independent of said lift means.

11. A skid jack according to claim 10 in which the handle has an extension depending below its pivot point, said upper body member having first stop means for engaging the handle extension and limiting forward pivoting of the handle beyond a substantially vertical upright position of said handle, and second stop means for limiting rearward pivoting of said handle beyond a rearwardly and upwardly-inclined position.

12. A skid jack according to claim 11 in which said upper body member has an upwardly-opening recess positioned to receive the end of said handle extension, said recess forming a seat for removably holding said handle extension and maintaining said handle in its vertical upright position.

13. A skid jack comprising a bipartite body frame which comprises an upper body member and a lower body member mounted on wheels, hinge means joining said upper and lower body members, lift means for raising the upper body member, said lift means including a foot pedal mounted on a shaft, the shaft having an outer section projecting from the body frame and an inner section pivotally coupled to the lower body member, the outer shaft section being connected to the inner section for rocking movement about the central axis of both shafts, said foot pedal shaft being coupled to said upper body member and being pivotable between a raised position in which the upper body member is in close proximity to the lower body member and a depressed position in which the upper body member is raised on said hinge relative to the lower body member, and latch means for releasably holding the foot pedal shaft in its depressed position, said latch means comprising a latch member centrally located on said outer shaft section, and a keeper fixed to said upper body member at one side of said shaft, the keeper receiving and retaining the latch member when the shaft is pivoted to its depressed position and the outer shaft section is rocked in the direction of said keeper.

14. A skid jack according to claim 13 in which the latch member comprises a latch finger having an angular tooth on its top end, the latch keeper comprising a flat boss having a notch at its bottom end, the tooth being positioned to engage within the notch.

15. A skid jack according to claim 14 in which a second boss is mounted on said upper body member opposite to and facing the keeper boss, said second boss having a downwardly tapered face, the latch member also having a second finger projecting outwardly from the shaft outer section, the second finger engaging and bearing frictionally against the second boss when the foot pedal shaft is released from its depressed position and allowed to rise to its raised position and the shaft outer section is rocked in the direction of said second boss.

16. A skid jack according to claim 15 in which the foot pedal is elongated and has two separated end sections sized to receive the foot of the operator, the shaft outer section rocking in one direction when one pedal section is depressed, and rocking in the opposite direction when the other pedal section is depressed.

References Cited in the file of this patent

UNITED STATES PATENTS 1,403,851     Donley _____ Jan. 17, 1922